Aug. 13, 1940.　　　　J. G. HEASLET　　　　2,211,654
TRACTOR FENDER GUARD
Filed April 5, 1940　　　2 Sheets-Sheet 1
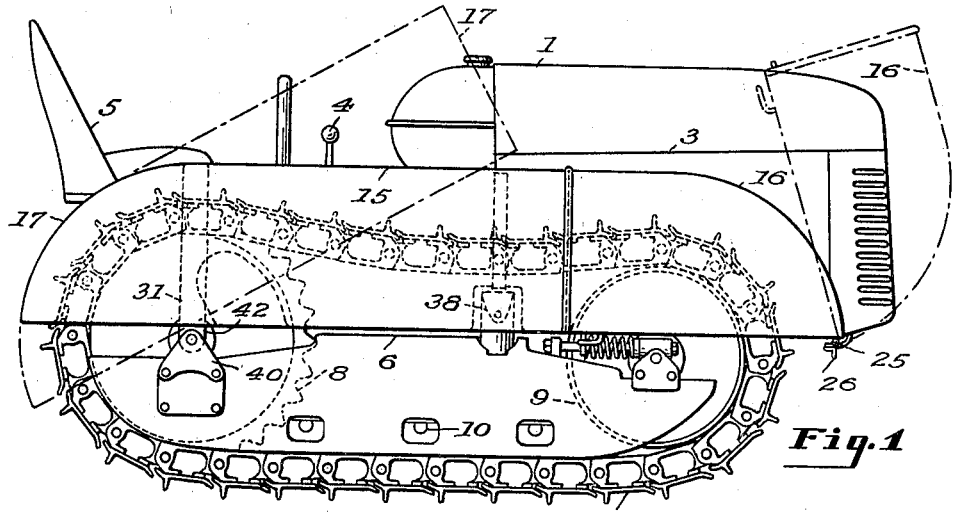
Fig.1
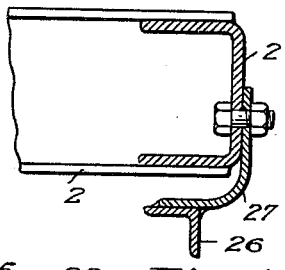
Fig.3
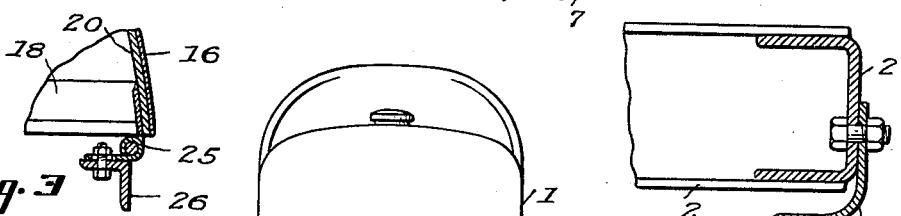
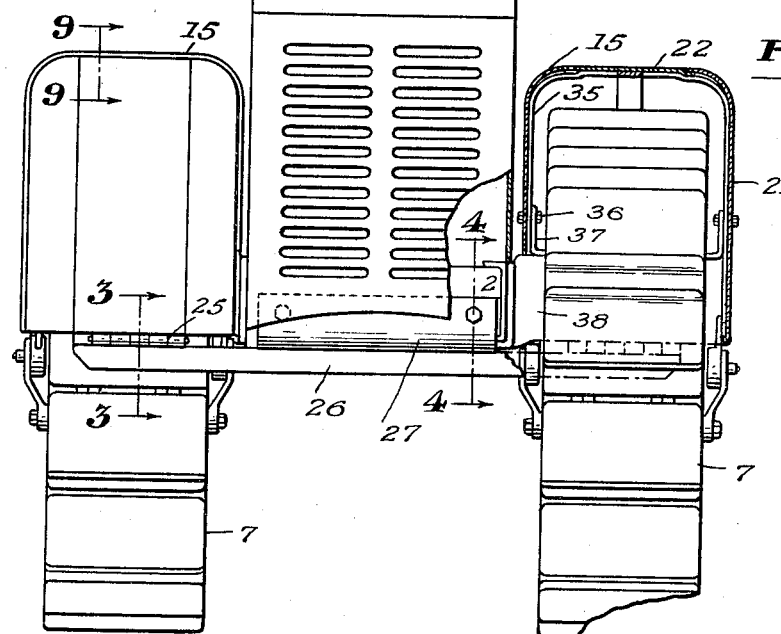
Fig.2
Fig.4
INVENTOR
JAMES G. HEASLET
BY George Douglas Jones
ATTORNEY Aug. 13, 1940.  J. G. HEASLET  2,211,654
TRACTOR FENDER GUARD
Filed April 5, 1940  2 Sheets-Sheet 2
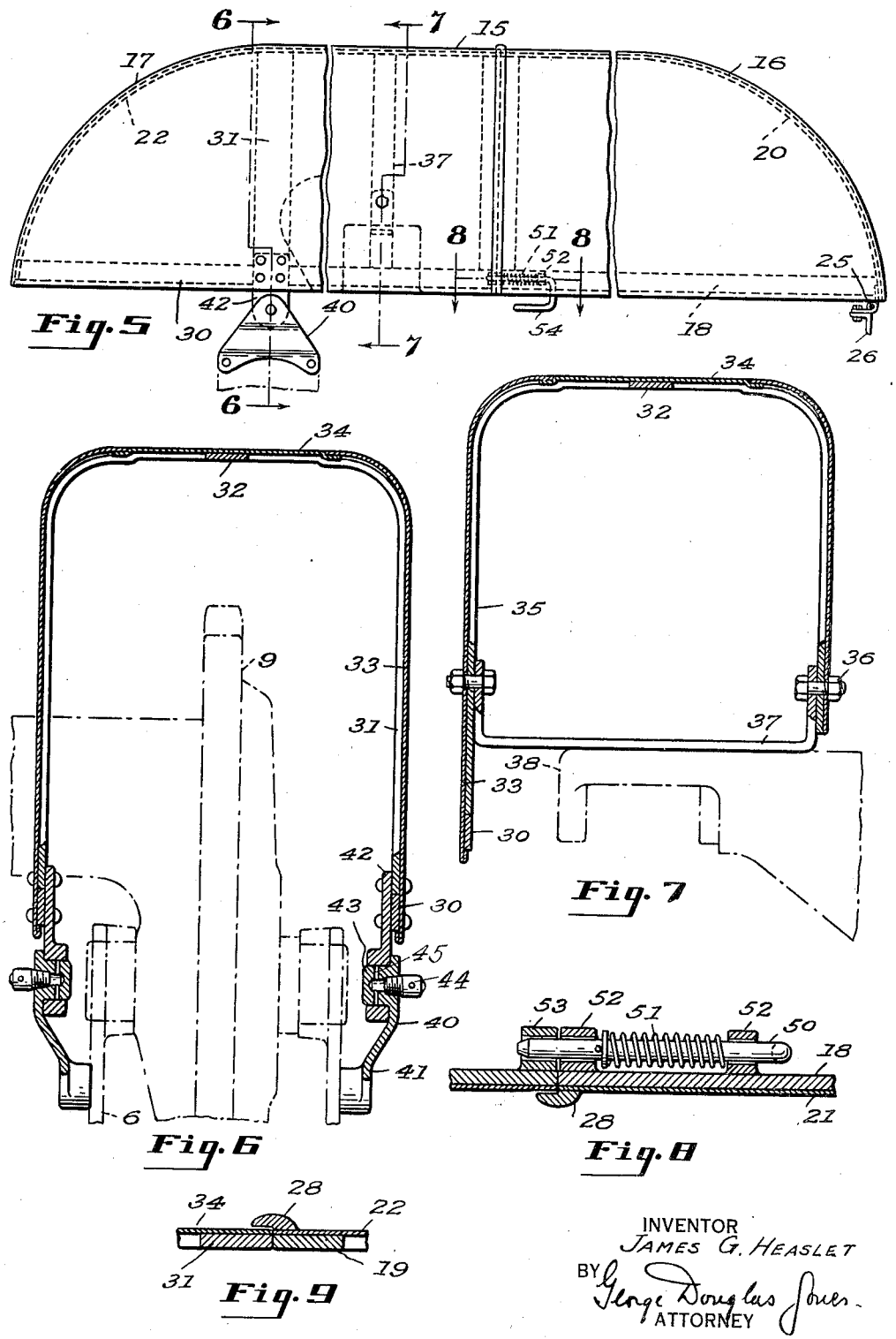
INVENTOR
JAMES G. HEASLET
BY
George Douglas Jones
ATTORNEY Patented Aug. 13, 1940

2,211,654

UNITED STATES PATENT OFFICE 2,211,654

TRACTOR FENDER GUARD

James G. Heaslet, Hudson, Ohio, assignor to The Cleveland Tractor Company, Cleveland, Ohio Application April 5, 1940, Serial No. 328,143

10 Claims. (Cl. 280—152)

This invention relates to protective covers or fender guards for the pivoted side frames of crawler type tractors and, more particularly, to a track cover that will effectively close in the upper run and front and rear portions of the track chains used in propelling tractors of this character.

An object of the invention is to provide a track guard which, while covering the whole upper part of the driven tracks, will also allow the guard to be quickly moved out of position to permit ready access to the tracks, track links, supporting rollers, drive sprockets and front idler wheels.

Another object is to rigidly support the covers in position around the top and sides of the tracks and enclose them in such a manner that they will not jar or shake loose when the tractor is traversing rough terrain.

A still further object of the invention includes the details of formation and construction, as hereinafter described and claimed, which contemplates a track guard that will effectively protect the operator from inadvertently catching his foot or hand in the moving tracks and prevent the tracks from tearing low branches and the like when the tractor is used in working an orchard.

In the drawings,

Fig. 1 is a side view of a crawler type tractor provided with a track cover embodying the present invention with the parts of the cover shown in dotted line when in opened position;

Fig. 2 is a front view, partly in section, showing the forward end of the track cover and a vertical section therethrough;

Fig. 3 is a vertical cross-section through the forward hinge taken on line 3—3 of Fig. 2 in the direction of the arrows;

Fig. 4 is a vertical cross-section through line 4—4 of Fig. 2, showing the front supporting means for the pair of track covers;

Fig. 5 is a side elevation of the track cover per se, illustrating the means for supporting the parts of the cover and the latch connecting the front and rear sections thereof;

Fig. 6 is a transverse section of the cover illustrating the details of the side supports therefor and taken on line 6—6 of Fig. 5;

Fig. 7 is a transverse section taken on line 7—7 of Fig. 5, showing the means of supporting the front part of the rear pivoted section of the fender;

Fig. 8 is a plan view, partly in section, of the latch for holding the front and rear sections together, taken on line 8—8 of Fig. 5; and Fig. 9 is a detail in cross-section of the overlapping sections of the cover sections.

As shown in the drawings, a crawler type tractor is generally designated by the numeral 1. This type of tractor includes a main chassis frame 2, power plant 3, controls 4 and operator's seat 5, together with driven articulated side track frames 6, having linked track belts 7 therearound. The track belts 7 are mounted on rear drive sprockets 8, front idlers 9, and supported on their lower runs by rollers 10 carried by the side frames 6.

Referring now to the track guards or covers 15, it will be observed that they comprise pivoted front and rear sections 16 and 17 which fit together in such a manner as to completely box in the top and sides of the tracks and depend over the upper portions of the drive sprockets and front idlers.

The front sections 16 of the guards are fabricated from sheet metal with heavy gauge metal supporting frames 18 extending horizontally around the lower side and front edges thereof. The rear edges of the front sections are attached to inverted U-shaped strips 19 the lower ends of which are secured to the ends of the horizontal edge strips 18, while the center of the covers are supported and reinforced by the upwardly curved strips 20 the ends of which are secured to the strips 18 and 19. The sheet metal cover 16 may be stamped or pressed from a single blank, although it is preferable and more economical to form it of side members 21 welded at their upper edges to the central top sheet or member 22.

The lower front edges of the frames 18 of sections 16 are pivotally joined to hinges 25 bolted to the transversely extending angle bar 26 welded to depending curved plate 27 carried by chassis frame 2. The extreme rear edges of the front sections are provided with continuous beads 28 welded thereto that overlap the parting joints between the front and rear sections 16 and 17 when in operative position, as shown in Fig. 9.

The rear sections 17 of the fenders are somewhat similarly formed to the front sections inasmuch as horizontal, vertical and upwardly curved frame members 30, 31, and 32, respectively, are provided for supporting the sheet metal side and top plates 33 and 34. In addition, a second inverted U-shaped supporting strip 35 is mounted within the covers 17 near their front edges. These frames 35 are secured by bolts 36 passing through the side walls of the covers 17 and engaging horizontal bracket bars 37. As will be seen in Fig. 7, the bottoms of bars 37 rest on the offset front track supports 38 and therefore this construction supports the weight of the covers. Consequently, the covers move with the chassis frame of the tractor, while the pivoted side frames maintain their independent movement.

As clearly illustrated in Figs. 1, 5, and 6, the rear sections 17 of the covers are pivotally secured through their vertical supporting frames 31 to horizontal pivot plates 40. Each plate 40 comprises a base member 41 riveted or bolted to opposite sides of the tractor track frames 6 having an upstanding arm 42 rotatably engaging an offset stud 43 formed adjacent the upper ends of the members 41, the arms 42 being fastened to the side and top frame members 30 and 31. A grease gun fitting 44 is threaded into the studs 43 to provide lubricant to the pivot through branch opening 45. It will be noted that the pivots 43 are in axial alignment with the rear axles carrying the drive chain sprockets 9 and, consequently, the rear cover sections 17 are fixed and merely pivot when the front end of the tractor rises or falls.

When the front and rear cover sections are in operative position over the tracks, as shown in solid lines in Fig. 1, the bead 28 overlies the meeting joint of the sections and the sections are rigidly held together by sliding bolt latches 50. The spring projected bolts 51 of the latches are mounted in spaced apertured holders 52 positioned adjacent the lower inner rear edges of the front sections. As shown in Fig. 8, the bolts project through cooperating apertured lugs 53 fastened to adjacent edges of the rear sections and are retracted by depending handles 54. When latched, the sections form sturdy enclosures for the track chains which afford ample protection to the operator while preventing branches of trees and plants from coming in contact with the moving track shoes. It will be noted that the front and rear portions of the covers are downwardly curved and thus will spread any low hanging branches they happen to strike and carry them away from the tractor.

What I claim is:

1. A track guard for crawler type tractors comprising a pair of hood sections pivoted adjacent the front and rear of the tractor and overlying the upper run of the crawler tracks, said sections interlapping at their free ends.

2. A track guard for crawler type tractors comprising two cooperating hood sections, one of said sections being pivotally secured to a bar affixed to the front end of the tractor, the other of said sections being pivotally secured to a bracket secured to the side frame of tractor with the free ends of said sections overapping one another.

3. A guard for a track chain of a crawler type tractor comprising a hood extending over the entire upper portions of the track chain, the hood consisting of a pair of pivoted sections secured to the tractor in such a manner that the free ends of the sections may be raised to expose the major portion of the track chain.

4. In a crawler tractor of the type including a main frame and pivoted side frames having endless power driven wheel supported ground engaging chains passing therearound, the combination therewith of guard fenders enclosing the upper, front and rear portions of said chains, said fenders comprising two inverted trough-like sections having free meeting edges, the outer ends of said sections being pivotally secured to the tractor.

5. A tractor fender of the character set forth in claim 4, wherein one of said sections is pivoted to the main tractor frame, while the other of said sections is pivoted to the tractor side frame.

6. A tractor fender of the character set forth in claim 4, wherein the said sections are composed of sheet metal carried over skeleton frames.

7. A tractor fender of the character set forth in claim 4, wherein the free ends of the said sections in operative position lie in overlapping relation and are secured one to the other by a spring projected retractable bolt.

8. A tractor fender of the character set forth in claim 4, wherein the free portion of one of said sections is supported by an offset bracket carried on the main frame of the tractor.

9. A tractor fender of the character set forth in claim 4, wherein the forward of said sections is hinged to a laterally extending bar secured to the front of the tractor main frame and the rear of said sections is pivotally secured to bracket arms carried on opposite sides of the pivoted track frame, the pivotal points of the said bracket arms being in axial alignment with the pivot point of the track frame.

10. A tractor fender of the character set forth in claim 4, wherein the front and rear extremities of the said fender sections are spaced from but curved downwardly to approximate the extended radius of the chain supporting wheels to a point substantially parallel to the hubs of the wheels.

JAMES G. HEASLET.